(12) United States Patent
Gu et al.

(10) Patent No.: US 10,592,932 B2
(45) Date of Patent: Mar. 17, 2020

(54) INTELLIGENT DRESSER AND CORRESPONDING CLOUD EXPERT DEVICE

(71) Applicant: BOE TECHNOLOGY GROUP CO., LTD., Beijing (CN)

(72) Inventors: Yu Gu, Beijing (CN); Junmin Sun, Beijing (CN); Zhongcheng Gui, Beijing (CN); Hongli Ding, Beijing (CN); Kai Zhao, Beijing (CN); Yifei Zhang, Beijing (CN); Ying Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 377 days.

(21) Appl. No.: 15/526,332

(22) PCT Filed: Sep. 5, 2016

(86) PCT No.: PCT/CN2016/098050
§ 371 (c)(1),
(2) Date: May 11, 2017

(87) PCT Pub. No.: WO2017/128721
PCT Pub. Date: Aug. 3, 2017

(65) Prior Publication Data
US 2018/0060919 A1    Mar. 1, 2018

(30) Foreign Application Priority Data

Jan. 29, 2016  (CN) .......................... 2016 1 0065230

(51) Int. Cl.
G06Q 30/02    (2012.01)
A47B 67/00    (2006.01)
(Continued)

(52) U.S. Cl.
CPC ......... *G06Q 30/0271* (2013.01); *A45D 40/24* (2013.01); *A45D 44/005* (2013.01);
(Continued)

(58) Field of Classification Search
None
See application file for complete search history.

(56) References Cited

U.S. PATENT DOCUMENTS

2002/0196333 A1 * 12/2002 Gorischek ............ A45D 44/005
348/61
2003/0064350 A1 *  4/2003 Rubinstenn .......... A45D 44/005
434/99

(Continued)

FOREIGN PATENT DOCUMENTS

CN    102693288 A    9/2012
CN    103689918 A    4/2014
(Continued)

OTHER PUBLICATIONS

English translation of the International Search Report and Written Opinion dated Dec. 7, 2016, for corresponding PCT Application No. PCT/CN2016/098050.

(Continued)

Primary Examiner — David J Stoltenberg
(74) Attorney, Agent, or Firm — Kinney & Lange, P.A.

(57) ABSTRACT

An embodiment of the present disclosure provides an intelligent dresser and a corresponding cloud expert device. The intelligent dresser introduces the cloud expert device on the basis of a conventional dresser to implement a customized recommendation of cosmetic product. The embodiment of the present disclosure meets the requirement of user's personalized and specialized requirements on cosmetic product caring to get a more targeted and effective skin care and dressing. Meanwhile, the embodiment of the present disclo- (Continued)

sure also provides a virtual dresser based on a mobile terminal, and has a good application prospect and valuable market.

17 Claims, 6 Drawing Sheets

(51) Int. Cl.
    *H04L 29/08*     (2006.01)
    *A45D 40/24*     (2006.01)
    *A45D 44/00*     (2006.01)
    *A47G 1/02*     (2006.01)
    *G06Q 30/00*     (2012.01)
    *G06Q 30/06*     (2012.01)

(52) U.S. Cl.
    CPC .............. *A47B 67/005* (2013.01); *A47G 1/02* (2013.01); *G06Q 30/016* (2013.01); *G06Q 30/0252* (2013.01); *H04L 67/02* (2013.01); *H04L 67/10* (2013.01); *H04L 67/12* (2013.01); *A45D 2044/007* (2013.01); *G06Q 30/0641* (2013.01)

(56) References Cited

U.S. PATENT DOCUMENTS

| | | | | |
|---|---|---|---|---|
| 2003/0065578 A1* | 4/2003 | Peyrelevade | ........ | A45D 44/005 705/14.54 |
| 2003/0065636 A1* | 4/2003 | Peyrelevade | ........ | A45D 44/005 706/62 |
| 2009/0187472 A1* | 7/2009 | Meloul | ................ | G06Q 10/06 705/7.12 |
| 2011/0016001 A1* | 1/2011 | Schieffelin | ........... | A61B 5/0059 705/14.66 |
| 2012/0329033 A1* | 12/2012 | Giacchetti | .............. | G06Q 50/22 434/377 |
| 2013/0152962 A1* | 6/2013 | Pires | .................... | A45D 33/006 132/313 |
| 2014/0252924 A1* | 9/2014 | Miller | .................. | A47B 49/004 312/202 |
| 2015/0021356 A1* | 1/2015 | Witchell | ................... | G01F 1/42 222/23 |
| 2015/0173488 A1* | 6/2015 | Witchell | ................... | G01F 1/42 222/23 |
| 2015/0248581 A1* | 9/2015 | Gouda | ............... | G06K 9/00281 345/633 |
| 2015/0356661 A1* | 12/2015 | Rousay | .............. | G06Q 30/0631 705/26.7 |
| 2016/0000209 A1* | 1/2016 | Yamanashi | ............ | A45D 44/00 434/100 |
| 2016/0180679 A1* | 6/2016 | Cowley | .................. | G08B 21/02 340/573.1 |
| 2016/0193108 A1* | 7/2016 | Cho | ........................ | A61N 2/00 600/9 |
| 2016/0299473 A1* | 10/2016 | Solis Zuniga | ............ | A61L 2/10 |
| 2017/0024589 A1* | 1/2017 | Schumacher | ......... | G06F 3/0481 |
| 2017/0178220 A1* | 6/2017 | Chong | ............... | G06Q 30/0631 |
| 2017/0270774 A1* | 9/2017 | Fateh | ............... | A45D 40/0068 |
| 2018/0060919 A1* | 3/2018 | Gu | ...................... | A47B 67/005 |
| 2018/0317633 A1* | 11/2018 | Witchell | ................... | G01F 1/42 |

FOREIGN PATENT DOCUMENTS

| | | | | |
|---|---|---|---|---|
| CN | 104199408 A | | 12/2014 | |
| CN | 204028685 U | | 12/2014 | |
| CN | 105147487 A | | 12/2015 | |
| CN | 105455522 A | | 4/2016 | |
| CN | 105678561 A | | 6/2016 | |
| CN | 109846227 A | * | 6/2019 | ............. A47B 67/00 |
| JP | 2009153609 A | | 7/2009 | |
| JP | 5204447 B2 | | 6/2013 | |
| KR | 10-1068388 B1 | * | 9/2011 | ............. A47B 67/00 |
| KR | 2014-0098551 A | * | 8/2014 | ............. G06Q 50/10 |
| KR | 2018-0127941 A | * | 11/2018 | ............. G06Q 10/10 |
| TW | I301890 B | * | 10/2008 | ............. G01N 33/50 |
| WO | WO 2015/013031 A2 | * | 1/2015 | ............. G05B 13/02 |
| WO | WO 2018/088584 A1 | * | 5/2018 | ............. A61B 5/00 |

OTHER PUBLICATIONS

First Chinese Office Action dated Jan. 11, 2019, received for corresponding Chinese Application No. 201610065230.5.

* cited by examiner

INTELLIGENT DRESSER AND CORRESPONDING CLOUD EXPERT DEVICE

CROSS-REFERENCE TO RELATED APPLICATION(S)

This application claims priority to Chinese Application with an application number of 201610065230.5, filed on Jan. 29, 2016 and entitled "INTELLIGENT DRESSER AND CORRESPONDING CLOUD EXPERT SYSTEM," which is incorporated herein by reference in its entirety.

TECHNICAL FIELD

An embodiment of the present disclosure relates to a technical field of intelligent home, and more particularly to an intelligent dresser and a corresponding cloud expert device

BACKGROUND

With improvements of people's quality of life, dressers have become an essential furniture in a bedroom, especially in a female bedroom. A main function of the dresser is to store and image. Users will store all kinds of skin care products/cosmetics in corresponding chambers of the dresser. When the user is making up, the user takes out of the skin care products/cosmetics to make-up and sees whether the makeup is appropriate from a mirror of the dresser.

Modern women provide a high requirement on their own, and it is very important for them about making-up. In addition, there are lots of types, application situation and methods of use for today's skin care products/cosmetics a. it is difficult for the modern women every day to choose a variety of skin care products/cosmetics for current skin condition, mental state, weather conditions and to correctly use these skin care products/cosmetics. Moreover, many users do not understand their own skin conditions, and it is inevitable with commercial color when these skin conditions are obtained from the traditional channels and it can't be customized about knowledge about skin care from the network channels.

SUMMARY

In view of the above mentioned technical problems, an embodiment the present disclosure provides an intelligent dresser and a corresponding cloud expert device to at least partially address problems of selecting and using skin care products/cosmetics during making-up process.

According to an aspect of the embodiment of the present disclosure, there is provided an intelligent dresser. The intelligent dresser comprises: an information processing module for uploading information related to a user's skin condition to a cloud expert device and presenting a beauty information issued by the cloud expert device and suited for the user's skin condition to the user; wherein the cloud expert device selects beauty information suited for the user's skin condition based on information related to the user's skin condition, and the beauty information including information about at least one of skin care products and/or cosmetics.

Alternatively, the intelligent dresser (100) further comprising an interactive information collection module (150) for acquiring information on at least one of user's skin condition consumption habits and cosmetic style in a manner that interacts with the user; the information processing module (160) is further configured to upload information on at least one of user's consumption habits and cosmetic style to the cloud expert device, and to present the beauty information issued by the cloud expert device and suited for at least one of the user's skin condition, user's habits and cosmetic style to the user.

Alternatively, the information related to the user's skin condition is a facial image of the user; and the intelligent dresser (100) further comprises a camera component (170) for capturing the facial image of the user.

Alternatively, the interactive information collection module (150) comprises a questioning component (1501) and a feedback information collecting component (1502); the information processing module (160) acquires an interaction question, asks the user the interaction question through the questioning component (1501), collects a feedback information of the user for the interaction question through the feedback information collecting module (1502) so as to obtain the user's skin condition; wherein the interaction question is a question about the user's skin condition which is stored locally on the intelligent dresser (100) or is issued by the cloud expert device (200); the questioning component (1501) is a speaker or a display component; the feedback information collecting module (1502) is a sound information collecting component or a touch or push type electronic device.

Alternatively, the interactive information collection module (150) is a touch screen (150); wherein the touch screen (150) implements functions of the questioning component (1501) and the feedback information collecting component (1502), and the information processing module (160) presents the beauty information suited for the user's skin condition to the user through the touch screen (150).

Alternatively, the intelligent dresser (100) further comprises a cosmetic mirror (140) facing towards a front side of the user; wherein a portion of the cosmetic mirror (140) is made of a unidirectional perspective glass and the camera component (170) is hidden at a back surface of the unidirectional perspective glass.

Alternatively, the intelligent dresser (100) is implemented in a form of a mobile terminal APP; wherein the camera component (170) is a front camera of the mobile terminal; the information processing module (160) presents the beauty information to the user through a screen of the mobile terminal.

Alternatively, the information processing module (160) further stores a cosmetic product database in which the information of the cosmetic products is stored; the information processing module (160) is further configured to send the cosmetic product database to the cloud expert device (200), and the cosmetic products in the beauty information issued by the cloud expert device (200) is selected from the cosmetic product database.

Alternatively, the intelligent dresser (100) further comprises: a storage box (130) for accommodating the cosmetic products and including a plurality of receptacles (132), each of which accommodates only one cosmetic product; wherein the cosmetic product database further stores accommodating position information of each of the cosmetic product, and the information processing module (160) presents a receptacle (132) of the corresponding cosmetic product to the user after the beauty information issued by the cloud expert device (200) is received.

Alternatively, each of the receptacles corresponds to one status indicator (131); and the information processing module (160) presents the receptacle (132) for accommodating the corresponding cosmetic product to the user by controlling lighting or flashing of the status indicator (132).

Alternatively, the intelligent dresser (100) further comprises: a cosmetic product primary information acquisition module (121) for acquiring primary information of a newly added cosmetic product; the information processing module (160) is further configured to upload the primary information of the newly added cosmetic product to the cloud expert device, receive at least one of product attribute information, classification information and validity information of the newly added cosmetic products obtained on the basis of the primary information and issued by the cloud expert device (200) and store the information in the cosmetic product database.

Alternatively, the information processing module (160) is further configured to present a cosmetic product which approaches or exceeds the validity period to the user based on the validity information of the cosmetic product stored in the cosmetic product database.

Alternatively, the plurality of receptacles (132) are sorted according to the type of the cosmetic products; the information processing module (160) is further configured to present the receptacles (132) for accommodating the newly added cosmetic product based on sorting information of the newly added cosmetic product; a pressure sensor (133) is provided at bottom of each of the receptacles (132); the information processing module (160) is further provided for sensing the position for accommodating the newly added cosmetic product by the pressure sensor (133) and storing the accommodating position information in the cosmetic product database; and a transparent cover (134) is provided over the plurality of receptacles (132), and the user see the cosmetic product accommodated in the receptacle (132) through the transparent cover (134).

According to another aspect of an embodiment of the present disclosure, there is also provided a cloud expert device. The cloud expert device comprises: a receiving module for receiving information related to user's skin condition; a cosmetic product selecting module for selecting beauty information suited for the user's skin condition based on the information related to the user's skin condition; an issuing module for issuing the beauty information selected by the cosmetic product selecting module, wherein the beauty information includes information about at least one of skin care product and the cosmetic.

Alternatively, the could expert device (200) further comprises: a user interaction module (210) for storing interaction questions; wherein the issuing module (240) issues the interaction questions; the information related to user's skin condition and received by the receiving module (220) is feedback information of the user for the interaction questions.

Alternatively, the information related to the user's skin condition is a facial image of the user; and the cloud expert device (200) further comprises a skin condition analyzing module (280) for analyzing the facial image of the user to obtain the user's skin condition.

Alternatively, the could expert device (200) further comprises a real-time information acquisition module (250) for obtaining at least one of a weather condition and an ultraviolet ray condition for the day; wherein the cosmetic product selecting module (230) is configured to select cosmetic products suited for at least one of user's skin condition, weather conditions and ultraviolet ray conditions.

Alternatively, the receiving module (220) is further configured to receive information about at least one of user's consumption habits and/cosmetic style; the cosmetic product selecting module (230) is configured to select the cosmetic product suited for at least one of the user's skin condition, user's consumption habits and cosmetic style.

Alternatively, the receiving module (220) is further configured to receive primary information of cosmetic products, and the cloud expert device (200) further comprises a cosmetic product information acquisition module (260) for acquiring at least one of a product attribute information, a classification information and validity information of the cosmetic products on the basis of the primary information; the issuing module (240) is further configured to issue at least one of the product attribute information, the classification information and the validity information of the cosmetic products Alternatively, the could expert device (200) further comprises a suggestion module (270) configured for providing a short-term skin care recommendation to the user based on the user's skin condition; and/or tracking change of the user's skin condition over a preset period and provide at least one of long-term skin care recommendations and health tips to the user based on the change of the user's skin condition; wherein the issuing module (240) is also configured to issue at least one of the short-term skin care recommendations, long-term skin care recommendations and health tips.

DETAILED DESCRIPTION

An embodiment of the present disclosure adds a function of interacting with a cloud expert device on the basis of an ordinary dresser, and it is possible to customize and recommend skin care product/cosmetic product for the user according to the user's own skin condition in real time and also realize a function of health tracking.

In order to clarify the objects, technical solutions and advantages of the present invention, the present disclosure will be described in greater detail in conjunction with particular embodiments and with reference to the accompanying drawings.

Figure 1A:
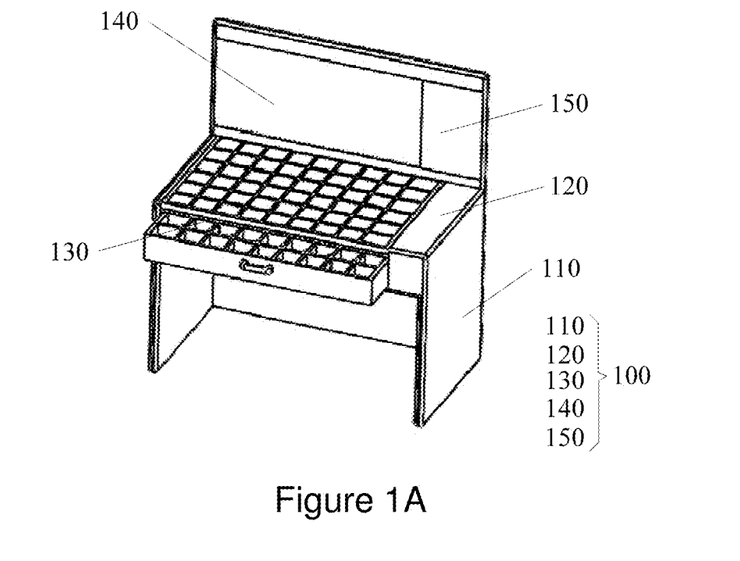
FIG. 1A is a hardware schematic diagram of an intelligent dresser according to a first embodiment of the present disclosure.
Figure 1B:
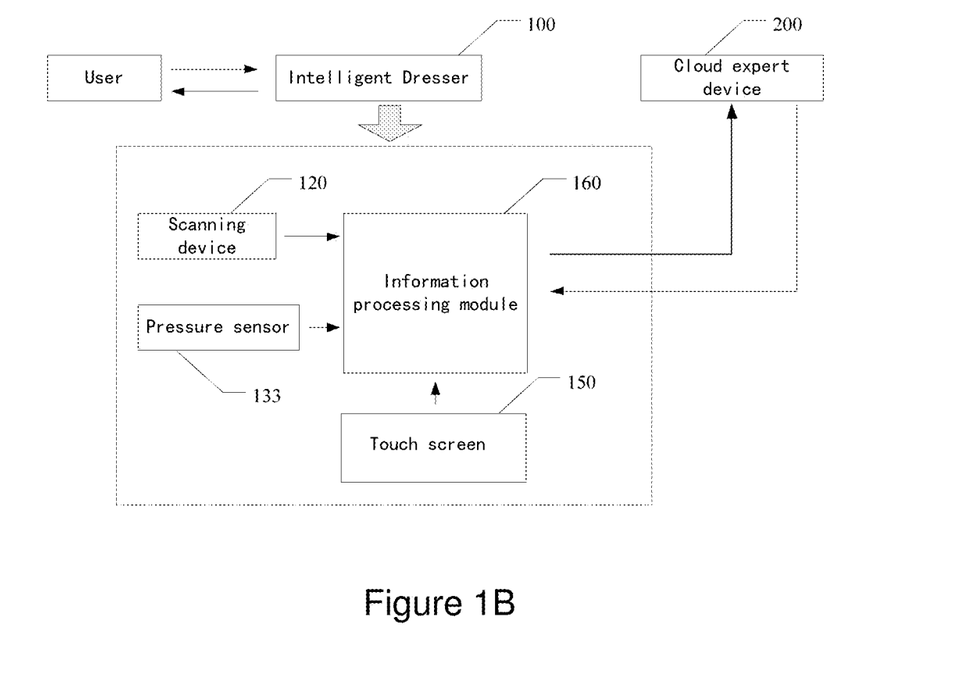
FIG. 1B is a structural block diagram of an intelligent dresser according to a first embodiment of the present disclosure.

In an exemplary embodiment of the present disclosure, there is provided an intelligent dresser 100. FIG. 1A is a hardware schematic diagram of an intelligent dresser according to a first embodiment of the present invention, and FIG. 1B is a structural block diagram of an intelligent dresser according to a first embodiment of the present invention. As shown in FIG. 1A and FIG. 1B, the intelligent dresser 100 of the present embodiment includes a base 110, a scanning device 120, a storage box 130, a cosmetic mirror 140, a touch screen 150 and an information processing module 160.

The storage box 130 is fixed over the base 110 and configured for accommodating a skin care product/cosmetic or the like. The cosmetic mirror 140 is fixed to a rear end of the base and faced toward facing towards a front side of the user. The scanning device 120 is configured to scan barcode information of the skin care product/cosmetics.

The information processing module 160 is located inside the intelligent dresser 100, connected to the cloud expert device 200 and configured to realize interactions between the intelligent dresser 100 and the cloud expert device 200, to coordinate the scanning device 120 in the intelligent dresser 100, the storage box 130 or the like as well as the cloud expert device 200.

The respective components of the intelligent dresser of the present embodiment will be described in detail below.

There is a corresponding cloud expert device 200 for the intelligent dresser 100 of the present embodiment. The intelligent dresser 100 and the cloud expert device 100 of the present embodiment operate together to implement various functions. In order to facilitate understanding of the present embodiment, the cloud expert device will be described first. The cloud expert device 200 acquires information related to user's skin condition and selects the skin care product/cosmetic product suited for the user's skin condition from the skin care product/cosmetic product accommodated in the storage box and recommends it to the user based on the information related to user's skin condition. The cloud expert device 200 may be located locally or in the cloud server.

In the present embodiment, particular structures of the base 110 and the cosmetic mirror 140 are shown in FIG. 1A, and is basically similar to the related parts of the prior art, and will not be described here for brevity.

Figure 2:
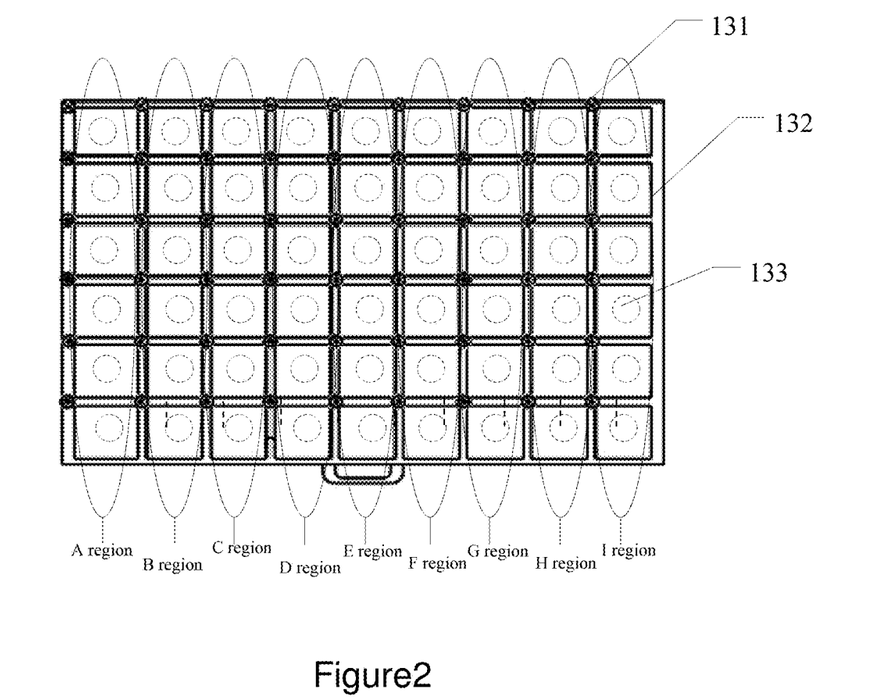
FIG. 2 is a schematic top view of the storage box in the intelligent dresser as shown in FIG. 1A and FIG. 1B.

FIG. 2 is a schematic top view of the storage box in the intelligent dresser as shown in FIG. 1A and FIG. 1B. As shown in FIG. 1A, FIG. 1B and FIG. 2, the storage box 130 is fixed over the base 110, is a pull-type storage box, and includes a plurality of receptacles 132. The receptacles 132 are configured to accommodate cosmetic products and each of the receptacles accommodates only one cosmetic product. Each of the cosmetic products is sorted to be accommodated and their information is recorded to facilitate recommendation of the cosmetic products. The cosmetic products include but are not limited to skin care products and cosmetics.

In other embodiments of the present disclosure, it is also possible to provide with an integral storage box to hold various cosmetic products together. However, in such a situation, the intelligent dresser can only display information about the recommended cosmetic products on the screen, and it cannot directly turn on the lights for the corresponding receptacles to recommend the cosmetic products within receptacles, which is inconvenient for the user.

For convenience and hygiene, a transparent cover is provided over the receptacles. The transparent cover may present dusts from falling into the receptacles, and meanwhile the user may distinctly see information about the cosmetic product accommodated in the receptacle through the transparent cover.

As shown in FIG. 1B and FIG. 2, a status indicator 131 may be provided around each of the receptacles. The status indicator 131 is connected to the information processing module 160. When the information processing module 160 receives cosmetic products recommendation list fed back by the cloud expert device 200, a signal is supplied to an indicator corresponding to the receptacle in which the corresponding cosmetic product is located to lighting or flashing the indicator to indicate that the cosmetic product within the receptacle is recommended. In addition, when the information processing module recommends a storage position of the cosmetic product or when the desired cosmetic product is absent, the status indicator 131 will also indicate, which will be described later. Alternatively the status indicator 131 is an LED.

In addition, a pressure sensor 133 is provided at bottom of each of the receptacles and the press sensor may be utilized to sense whether the cosmetic products (skin care product or cosmetics) are actually accommodated.

The receptacles in the storage box are sorted in columns to facilitate the storage of items. The forms for accommodating may be customized, or the device default settings may be used, In particular, an A region accommodates a facial cleanser, a B region accommodates water replenishing product, a C region accommodates latexes, a D region accommodates creams, an E region accommodates sunscreen products, an F region accommodates makeup bases and the like, the other region such as a G region, a H region, an H region are defaulted to be empty, and the user may customize these regions according to their own requirements through the information processing module. In other words, the same regions may accommodate the same types of cosmetic products with different parameters. Similarly, the receptacles within the storage box may be sorted in lines, and different regions may accommodate the same type of cosmetic products with different parameters.

The intelligent dresser further comprises an interactive information collection module 150. In particular, the interactive collection module comprises a questioning component and a feedback information collecting component. The information processing module 160 acquires an interaction question, asks the user the interaction question through the questioning component, collects feedback information of the user for the interaction question through the feedback information collecting module so as to obtain the user's skin condition.

In the present embodiment, the interactive information collection module is a touch screen 150. The touch screen 150 implements functions of the questioning component and the feedback information collecting component. Meanwhile, the information processing module 160 presents the beauty information suited for the user's skin condition to the user through the touch screen 150.

Among others, the interaction questions are stored locally on the intelligent dresser or are issued by the cloud expert device. The interaction questions include a series of questions about skin condition, consumption habits, and cosmetic style and so on. The intelligent dresser may ask questions about skin condition to the user and receives user's feedback information by the information processing module 160 and the touch screen 150 to obtain the user's skin condition information such as dry skin, oily skin, mixed skin, blackhead and so on, the user's consumption habit information such as moderate consumption, high consumption, as well as the user's cosmetic style information, such as casual style, formal style, party style and so on.

Referring to FIG. 1A and FIG. 1B, the touch screen 150 is disposed side by side with the cosmetic mirror 140 and its height is consistent with that of the cosmetic mirror 140.

With respect to the position of the touch screen, the touch screen may also be provided in the upper or lower part of the cosmetic mirror, or may be built in the cosmetic mirror to be integrated with the cosmetic mirror to realize the present invention. In addition, if the touch screen is only utilized to display the information and does not function as a skin condition collection module, the touch screen 150 may also be replaced with a conventional LED display screen.

It should be noted that except that the touch screen is configured to interact with the user during the facial information collection process, it may be used to interact with the user to provide device settings, such as cosmetic products accommodating settings. In addition, the touch screen is also used to display recommended results of the cloud expert device, the user's skin condition and precautions, skin care knowledge, weather conditions, UV status, etc., which will be reflected in the following.

Figure 3:
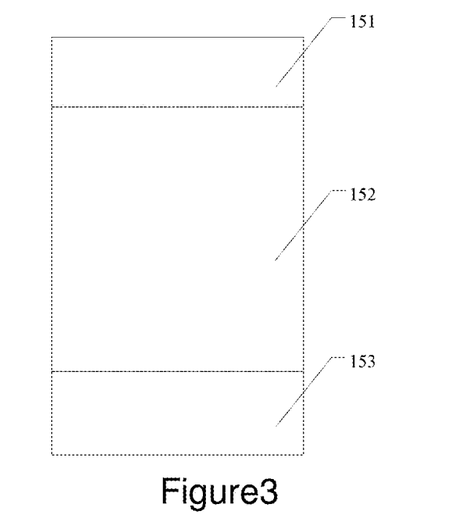
FIG. 3 is a schematic view of partitions of a touch screen in the intelligent dresser as own in FIG. 1A and FIG. 1B.

FIG. 3 is a schematic view of partitions of a touch screen in the intelligent dresser as own in FIG. 1A and FIG. 1B. Referring to FIG. 3, in this embodiment, the touch screen is divided into the following regions:

1. General Information Display Region 151

The general information display region 151 may display information such as time, weather conditions of the day, ultraviolet ray condition, etc., which may be obtained by the cloud expert device via the Internet.

2. Personalized Information Display Region 152

The personalized information display region 152 displays the skin care advice issued by the cloud expert device for the user's skin condition, the recommended cosmetic products, currently lacked cosmetic products, and purchasing channel for the currently lacked cosmetic products.

3. Information Collection Region 153

The user interacts through the information collection region 153, which displays the questions that the user interaction module needs to ask the user and receives the feedback from the user. Specifically, when it is used, the user clicks on a bottom of "start evaluation" in the information collection region 153, and the user interacts with the cloud expert device in a manner that answers the question in conjunction with the user interaction module, and the information processing module 160 uploads information about the user's skin condition such as dry skin, oily skin, mixed skin, black head or the like, user's consumption habits, user's cosmetic style and son on to the cloud expert device.

In consideration of cost, the general information display region 151 and the personalized information display region. 152 of the touch screen of the present embodiment are designed to have only a display function and the information interacting function are integrated on the information collection region 153. In other embodiments of the present disclosure, the entire touch screen 150 may be designed as a region having an interactive function irrespective of the cost. In this case, the region selection and software programming will be more flexible.

Referring to FIGS. 1A and 1B, the scanning device 120 is provided at one side of the storage box. The newly added cosmetic product is scanned by the scanning device 120, and the classification and attribute information of the cosmetic product may be known by the cloud expert device 200, and the classification and attribute information is input to the information processing module. At the same time, the information processing module searches for the receptacle suited for accommodating the cosmetic product according to the classification and attribution information in conjunction with the accommodating sets provided by the user, and recommends such a receptacle to the user via the touch screen 150 or the status indicator 131 corresponding to the receptacle It should be noted that, in addition to the scanning device 120, the intelligent dresser may also utilize other cosmetic product primary information acquisition devices 121 to obtain primary information of cosmetic products, and then to obtain further details of the cosmetic products according to the primary information through the cloud expert device. Here will be omitted for brevity.

In the present embodiment, the cloud expert device 200 is located on a cloud server in Internet. The user interacts with the touch screen 150, which sends the corresponding data to the cloud expert device 200 through the information processing module; the cloud expert device processes the data request, sends processing results to the information processing module 160 and displays it on the touch screen 150.

The information processing module 160 is used to coordinate operations of the storage box 130, the skin condition collection module, the scanner device 120, and the cloud expert device. The information processing module 160 is connected to the other functional modules of the dresser body 100 and the cloud expert device 200 wirelessly or by wires. In the followings, the process of the information processing module and the entire intelligent dresser will be introduced for each of the functions.

1) Accommodating of Cosmetic Products

Figure 4:
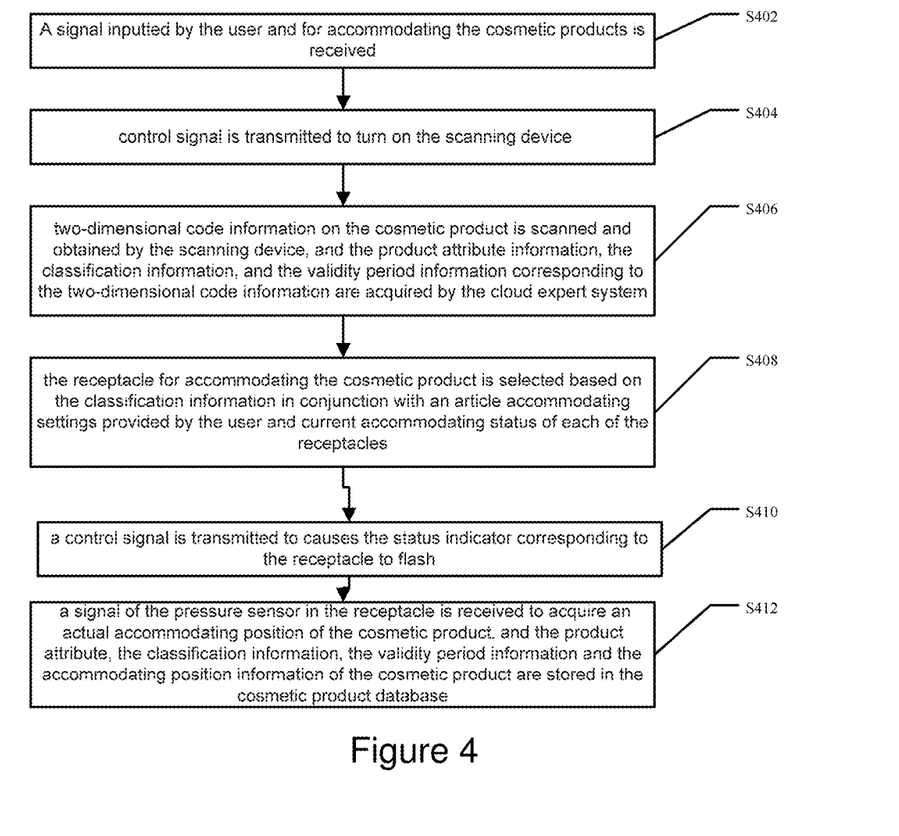
FIG. 4 is a flow chart of accommodating a newly added skin care product/cosmetic product by the information processing module in the intelligent dresser as shown in FIG. 1A and FIG. 1B.

Referring to FIG. 4, when it is necessary for intelligent dresser to accommodate cosmetic products, the steps which is performed by the information processing module 160 are shown as follow:

At a step of S402, a signal inputted by the user and for accommodating the cosmetic products is received.

At a step of S404, a control signal is transmitted to turn on the scanning d device 120.

At a step of S406, two-dimensional code information on the cosmetic product is scanned and obtained by the scanning device, and the product attribute information, the classification information, and the validity period information corresponding to the two-dimensional code information are acquired by the cloud expert device 200.

At a step of S408, the receptacle for accommodating the cosmetic product is selected based on the classification information in conjunction with an article accommodating settings provided by the user and current accommodating status of each of the receptacles.

Ata step of S410, a control signal is transmitted to causes the status indicator corresponding to the receptacle to flash.

At this point, the user may put the items into the corresponding receptacle according to the flashed status indicator.

At a step of S412, a signal of the pressure sensor in the receptacle is received to acquire an actual accommodating position of the cosmetic product, and the product attribute, the classification information, the validity period information and the accommodating position information of the cosmetic product are stored in the cosmetic product database.

Every time the intelligent dresser is started up, the information processing module will search in the cosmetic product database; and when it is found that there are cosmetic products which approach or exceed the validity period, the user is indicated through the status indicator of the receptacle corresponding to the cosmetic product, the touch screen 150 or a voice module.

(2) Recommending of Cosmetic Products

Figure 5:
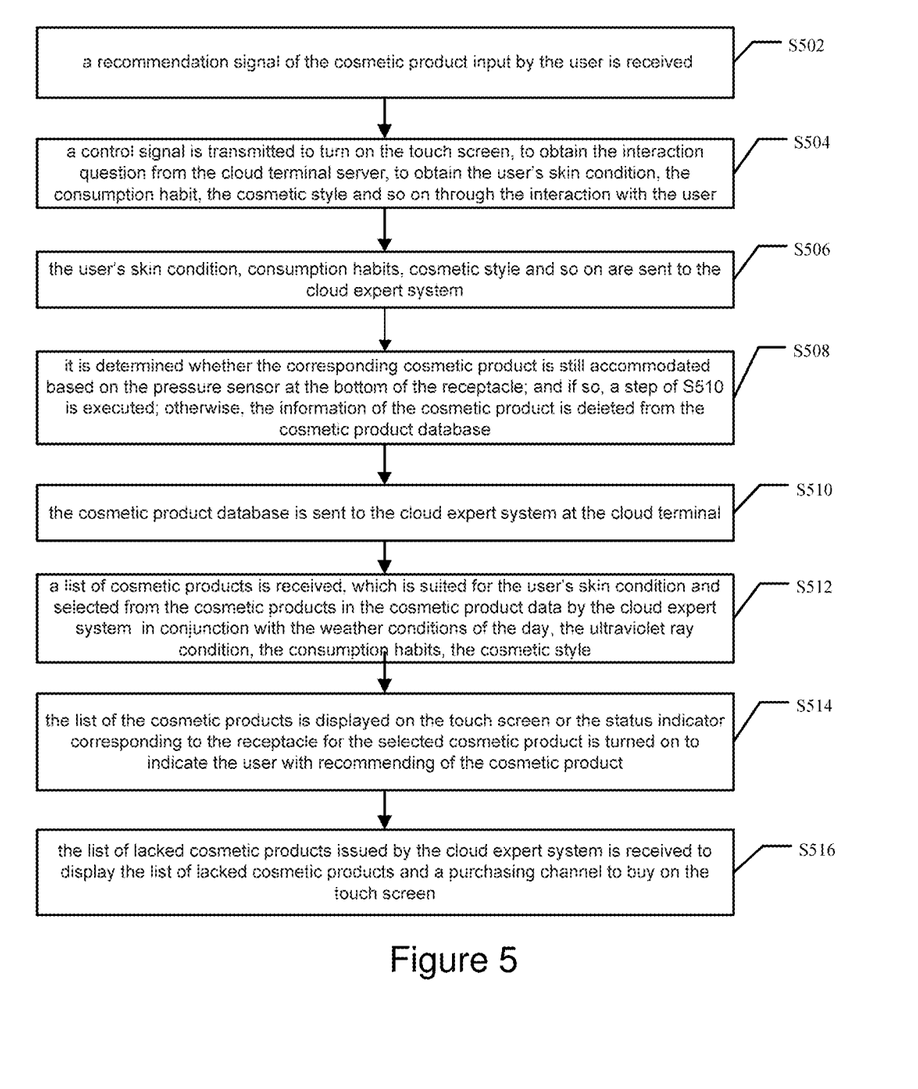
FIG. 5 is a flow chart of recommending a skin care product/cosmetics by the information processing module in the intelligent dresser as shown in FIG. 1A and FIG. 1B.

Referring to FIG. 5, when it is necessary for intelligent dresser to recommend cosmetic products, the steps which is performed by the information processing module are shown as follow:

Ata step of S502, a recommendation signal of the cosmetic product input by the user is received.

At a step of S504, a control signal is transmitted to turn on the touch screen, to obtain the interaction question from the cloud terminal server, to obtain the user's skin condition, the consumption habit, the cosmetic style and so on through the interaction with the user At a step of S506, the user's skin condition, consumption habits, cosmetic style and so on are sent to the cloud expert device.

At a step of S108, it is determined whether the corresponding cosmetic product is still accommodated based on the pressure sensor at the bottom of the receptacle; and if so, a step of S510 is executed; otherwise, the information of the cosmetic product is deleted from the cosmetic product database and then the step of S510 is executed.

At a step of S510, the cosmetic product database is sent to the cloud expert device at the cloud terminal.

At a step of S512, a list of cosmetic products is received, which is suited for the user's skin condition and selected from the cosmetic products in the cosmetic product data by the cloud expert device in conjunction with the weather conditions of the day, the ultraviolet ray condition, the consumption habits, the cosmetic style.

At a step of S514, the list of the cosmetic products is displayed on the touch screen or the status indicator corresponding to the receptacle for the selected cosmetic product is turned on to indicate the user with recommending of the cosmetic product.

At a step of S516, the list of lacked cosmetic products issued by the cloud expert device is received to display the list of lacked cosmetic products and a purchasing channel to buy on the touch screen.

3) Recommendation of Skin Care.

Figure 6:
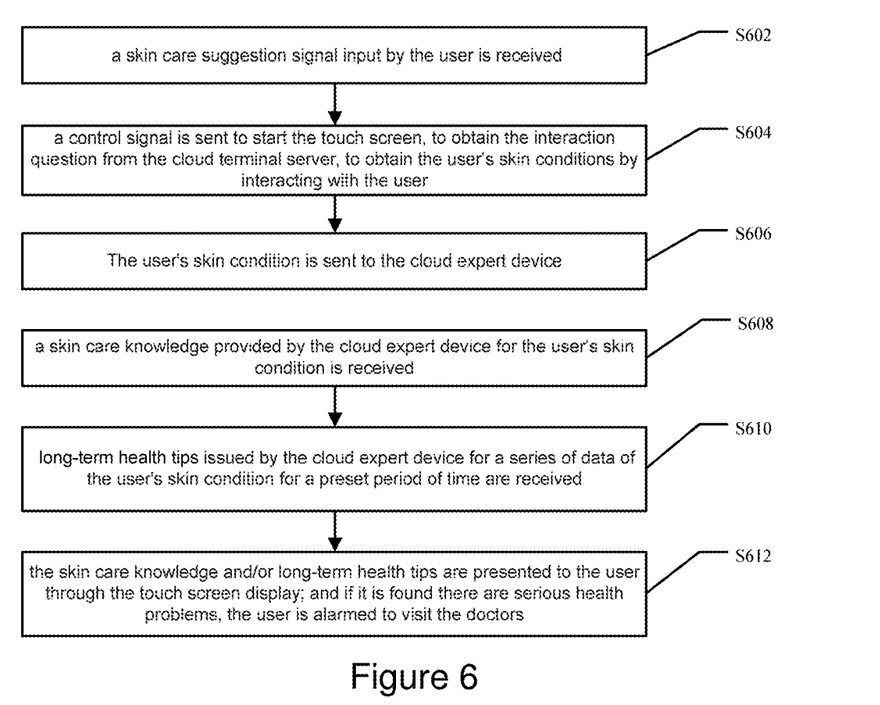
FIG. 6 is a flow chart of proving suggestion of skin care by the information processing module in the intelligent dresser as shown in FIG. 1A and FIG. 1B.

Referring to FIG. 6, when a function of skin care recommendations is enabled, the information processing module need to perform the following steps:

At a step of S602, a skin care suggestion signal input by the user is received.

At a step of S604, a control signal is sent to start the touch screen, to obtain the interaction question from the cloud terminal server, to obtain the user's skin conditions such as dry skin, oily skin, mixed skin, blackhead and so on by interacting with the user.

At a step of S606, the user's skin condition is sent to the cloud expert device.

At a step of S608, a skin care knowledge provided by the cloud expert device for the user's skin condition is received.

At a step of S610, long-term health tips issued by the cloud expert device for a series of data of the user's skin condition for a preset period of time are received.

The time period may be a week, a month or a year, the could expert device may find the health of the user's skin or body according to the series of data of the user's skin condition, and provides health tips based on the health condition, such as adjusting the diet, appropriately reducing outdoor lighting and so on.

At a step of S612, at least one of the skin care knowledge and long-term health tips are presented to the user through the touch screen display; and if it is found there are serious health problems, the user is alarmed to visit the doctors.

Thus, the embodiment of the present disclosure adds a function of interacting with a cloud expert device on the basis of an ordinary dresser, and it is possible not only to recommend the most suitable cosmetic product for the user according to the user's own skin condition and the weather at the day, but also to carry out health tracking function of the user's skin condition and recommend a rationalization proposals. The cloud expert device ensures professionalism of the recommended cosmetic products and suggestions of cosmetic products, so that the skin care and cosmetics are more targeted and effective.

In the second embodiment of the present disclosure, there is also provided a cloud expert device corresponding to the intelligent dresser of the first embodiment.

Figure 7:
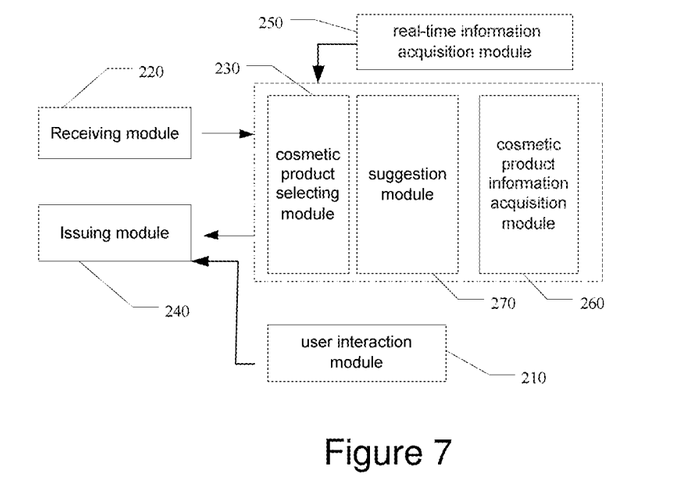
FIG. 7 is a schematic structural diagram of a cloud expert device according to a second embodiment of the present disclosure.

Referring to FIG. 7, the cloud expert device 200 comprises a user interaction module 210 for storing interaction questions; a receiving module 220 for receiving information related to user's skin condition and cosmetic product database; a cosmetic product selecting module 230 for selecting beauty information suited for the user's skin condition based on the information related to the user's skin condition; and an issuing module 240 for issuing the beauty information selected by the cosmetic product selecting module.

Among others, the questions stored in the user interaction module 210 is provided by a professional organization, and may be updated regularly, and even may be specifically specified by a professional organization for a specific user to specify a targeted interaction problem. The information about the user's skin condition is the user's feedback on the interaction questions. Through the feedback information, the cloud expert device obtains the user's skin condition.

Among others, the cloud expert device further comprises a real-time information acquisition module (250) for obtaining at least one of a weather condition and an ultraviolet ray condition for the day. The cosmetic product selecting module (230) is configured to select at least one of cosmetic products suited for user's skin condition, weather conditions and ultraviolet ray conditions.

In addition, the receiving module 220 is further configured to receive information about at least one of user's consumption habits and cosmetic style. The cosmetic product selecting module 230 is configured to select at least one of the cosmetic product suited for the user's skin condition, user's consumption habits and cosmetic style based on the user's skin condition.

In addition, the receiving module 220 is further configured to receive primary information of a cosmetic product. The cloud expert device further comprises a cosmetic product primary information acquisition unit 260 for acquiring at least one of a product attribute information, classification information and validity information of the cosmetic products on the basis of the primary information. The issuing module 240 is further configured to issue the product attribute information, the classification information and the validity information of the cosmetic products In addition, the could expert device 200 further comprises a suggestion module 270 configured for providing a short-term skin care recommendation to the user based on the user's skin condition; and/or tracking change of the user's skin condition over a preset period and provide at least one of long-term skin care recommendations and health tips to the user based on the change of the user's skin condition. Among others, the issuing module 240 is also configured to issue at least one of the short-term skin care recommendations, long-term skin care recommendations and health tips.

The specific solution for the cosmetic product selection module may be provided by a professional organization. In addition, the professional organization may also use the vast information on the Internet to find the solution to be recommended to the user.

Specifically, the cloud expert device may implement the following functions:

(1) Weather information, ultraviolet ray information, etc. are obtained via the Internet and are presented to the user through the touch screen 150.

(2) the user's skin condition collected by the skin condition collection module is received, and appropriate cosmetic products are selected from the storage box to be recommended to the user based on the user's skin condition, preferably combining with the weather information, the ultraviolet ray information, the user's consumption habits and the cosmetic style, according to the skin care solution obtained from the existing solution or from the Internet.

Figure 8:
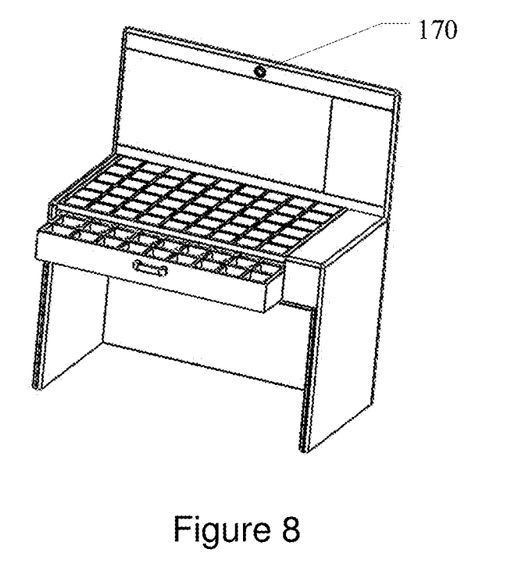
FIG. 8 is a schematic view of an intelligent dresser according to a third embodiment of the present disclosure.

In the third embodiment of the present disclosure, there is also provided an intelligent dresser. The intelligent dresser is similar to that of the first embodiment except that the information relating to the user's skin condition is user's facial information.

Referring to FIG. 8, the intelligent dresser also includes a camera 170 at op of the cosmetic mirror. The camera captures the user's facial image. Taking into account the image quality, the resolution of the camera should be at least 30 megapixels. The user's facial image is uploaded to the cloud expert device through the information processing module and the network.

In this case, the corresponding cloud expert device also comprises a skin condition analyzing module 280 for analyzing the facial image of the user to obtain the user's skin condition, such as dry skin, oily skin, mixed skin, blackhead and so on. Among others, the skin condition analyzing module 280 has to use the corresponding algorithm, which is not a key point of the present disclosure and will not be illustrated in detail.

It should be noted that, in order for brevity, any of the technical features described in the above-described embodiment 1 may be used for the same application, do not need to repeat the same description.

In the fourth embodiment of the present disclosure, there is also provided a cloud expert device corresponding to the intelligent dresser of the third embodiment. The cloud expert device is similar to the cloud expert device of the second embodiment except that the cloud expert device also includes a skin condition analyzing module 280.

Specifically, in the cloud expert device, the receiving module 220 is configured to receive a user's facial image and a cosmetic product database; the skin analysis module 280 is configured to acquire a user's skin condition based on a user's facial image.

The cosmetic product selection module 230 and the issuing module 240 of the present embodiment are the same as those of the cloud expert device of the second embodiment, and will not be repeated again.

Figure 9:
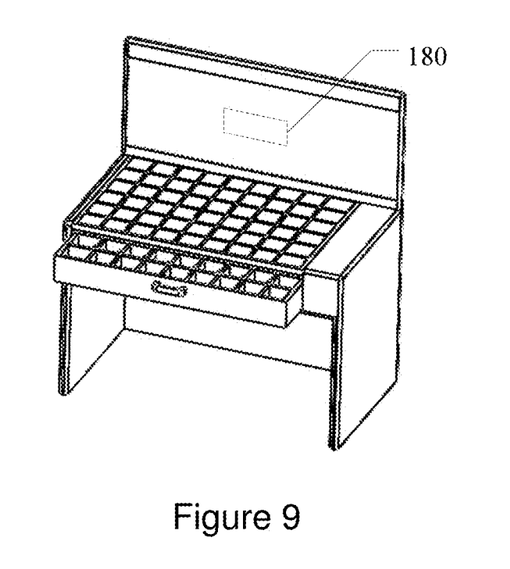
FIG. 9 is a schematic view of an intelligent dresser according to a fifth embodiment the present disclosure.

In the fifth embodiment of the present invention, there is also provided an intelligent dresser. Referring to FIG. 9, the intelligent dresser is similar to the intelligent dresser structure of the third embodiment except for that the middle portion 180 of the cosmetic mirror (dotted portion in the figure) is manufactured by utilizing a unidirectional perspective glass (commonly known as a double-sided mirror), and a CCD camera component 170 such as a camera is provided at the back side of the unidirectional perspective glass.

The CCD imaging device collects the user's facial image through the unidirectional perspective glass in the cosmetic mirror. In this case, the CCD imaging device may directly face towards the user's face, so that the acquisition signal is more accurate or convenient, while it avoids setting up an additional camera, and will not damage the overall appearance of the dresser.

The first, third and fifth embodiments are provided for an entity dresser. In the sixth embodiment of the present invention, there is also proposed a virtual dresser which is similar to the case of the third embodiment of the present invention except for that the virtual dresser is implemented in a form of mobile terminal APP.

The intelligent dresser of the present embodiment includes a camera for acquiring a user's facial image, and a display module for presenting at least one of the obtained skin care suggestions and the recommended cosmetic product to the user.

Among others, the mobile terminal may be mobile phones, tablet PCs and so on. By taking the mobile phone as an example, the camera may be a front camera or rear camera of the mobile phone. Considering the accuracy and angle of the image, the front camera is more advantageous for the user to adjust, so the camera is alternatively a front camera. In addition, the display module may be implemented by using a touch screen of the mobile terminal.

The present embodiment may combine with a mobile client terminal, and it is possible to realize that the dresser is carried on the body, and it is possible to obtain a targeted cosmetic product recommendation and a beauty knowledge pushing whenever and wherever there is a great convenience.

In the sixth embodiment of the present invention, there is also provided an intelligent dresser. The intelligent dresser is also implemented by using the mobile terminal APP, and differs from the fifth embodiment only in that the skin condition collection module employs an interactive information acquisition component similar to that of the first embodiment.

In particular, the interactive information collection module is a touch screen (150). A series of interaction questions about skin condition, consumption habits and cosmetic styles are stored in the user interaction modules of the cloud expert device. The information processing module acquires these interaction questions, and asks the user and receives feedback from the user through the touch screen to obtain the user's skin condition, user's consumption habits, and user's cosmetic style. The information will be sent back to the cloud expert to be basis for recommending the cosmetic products. That is to say, the user interacts with the cloud expert device through the touch screen in a form of asking and answering questions.

It can be seen from the above technical scheme that the intelligent dresser and the corresponding cloud expert device according to embodiments of the present disclosure have the following beneficial effects:

(1) The cloud expert device provide users with skin care information and recommend skin care products/cosmetics in conjunction with the user's skin condition, which enhance the professional, more targeted, greatly enhance the user experience;

(2) The skin care information and recommended skin care products/cosmetics are provided in conjunction with weather conditions, UV ray conditions, the user's consumption habits, to ensure that users get the best cosmetic instruction every day, which has the potential commercial value.

(3) The cloud expert device may found that the user's skin or physical health based on a series of data of the user's skin condition, and provide solutions to implement a health tracking function based on the health status.

(4) The embodiments of the present disclosure improve the current dresser in conjunction with the cloud expert device, and uniquely design the cosmetic mirror, storage box, cover and other components of the dresser and also adds a pressure sensor, status indicator and other components so that the dresser is more intelligent.

(5) The embodiments of the present disclosure provides a virtual dresser in conjunction with the mobile terminal, which may be implemented with a dresser on the body to facilitate the user to get targeted skin care knowledge and skin care products/cosmetics recommendation with great convenience.

Heretofore, six embodiments of the present disclosure have been described in detail with reference to the accompanying drawings. According to the above description, those skilled in the art will have a clear understanding of the intelligent dresser of the present invention.

It is to be understood that the means not described or described in the context of the drawings or description are known to those of ordinary skill in the art and are not described in detail. In addition, the above-mentioned definitions of the elements and methods are not limited to the various specific structures, shapes or modes as mentioned in the embodiments, and those skilled in the art may simply change or replace them, for example:

(1) The direction words mentioned in the examples, such as "up", "down", "front", "post", "left", "right", etc., are merely directions in the drawings and are not intended to limit the scope of the present invention.

(2) The order of the steps in the above embodiments is not limited to those listed above and may be varied or rearranged according to the desired design unless otherwise specifically described or must be carried out in sequence.

(3) The embodiments described above may be used in combination with other embodiments or may be used in combination with other embodiments based on design and reliability considerations, i.e., the technical features in the different embodiments may be freely combined to form more embodiments.

In summary, on the basis of the traditional dresser, the present disclosure implements a personalized recommendation of the cosmetic products by introducing the cloud expert device, and solves the user's requirement for personalization and specialization of the beauty care and makes the skin care and make-up more targeted and more effective. Meanwhile, the embodiment of the present disclosure also provides a virtual dresser based on a mobile terminal with good application prospects and market values.

The foregoing detailed description of the objects, technical solutions and advantages of the invention has been made in detail, and it should be understood that the foregoing is only a specific embodiment of the invention and is not intended to limit the invention. Any modifications, equivalent substitutions, improvements and the like falling within the spirit and principles of the invention are intended to be included within the scope of the present invention.

We claim:

1. An intelligent dresser, comprising:
   a storage box for accommodating a plurality of cosmetic products, the storage box comprising a plurality of receptacles, each of which is configured to accommodate one of the plurality of cosmetic products, wherein each receptacle of the plurality of receptacles is provided with a pressure sensor for determining presence or absence of the cosmetic products in the receptacle and a status indicator;
   a memory for storing a cosmetic product database in which information of the cosmetic products accommodated in the storage box and accommodating position information of the cosmetic products are stored;
   a scanner configured to scan a barcode or two-dimensional code on the cosmetic product; and
   an information processor connected to the memory, the scanner, each pressure sensor and each status indicator, wherein the information processor is configured for:
   in response to an accommodating signal, turning on the scanner to scan the barcode or two-dimensional code on the cosmetic product to be accommodated, uploading the scanned barcode or two-dimensional code to a cloud server, receiving information of the cosmetic product to be accommodated from the cloud server, determining a position of the receptacle accommodating the cosmetic product to be accommodated by using the respective pressure sensor, and storing the information of the cosmetic product to be accommodated and the determined position of the receptacle as the accommodating position information in the cosmetic product database; and
   in response to a recommendation signal, uploading information related to a user's skin condition and the cosmetic product database to a cloud server, receiving, from the cloud server, beauty information related to one or more selected cosmetic products selected from the cosmetic products accommodated in the storage box, determining positions of respective one or more receptacles accommodating the one or more selected cosmetic products based on the received beauty information and the accommodating position information stored in the memory, and presenting the position of the respective one or more receptacles to the user through turning on the status indicator of the respective one or more receptacles accommodating the one or more selected cosmetic products; and
   wherein the one or more selected cosmetic products are selected by the cloud server based on the cosmetic product database according to the information related to the user's skin condition, and the beauty information includes information about at least one of skin care products and cosmetics.

2. The intelligent dresser according to claim 1, wherein the intelligent dresser further comprises a touch screen for acquiring information on at least one of user's skin condition, consumption habits and cosmetic style in a manner that interacts with the user; and
   the information processor is further configured to upload information on at least one of the user's consumption habits and cosmetic the cloud server, and to present the beauty information issued by the cloud expert device and suited for at least one of the user's skin condition, consumption habits and cosmetic style to the user.

3. The intelligent dresser according to claim 1, wherein the information related to the user's skin condition is a facial image of the user; and the intelligent dresser further comprises a camera component for capturing the facial image of the user.

4. The intelligent dresser according to claim 2, wherein:
the touch screen comprises a questioning component and a feedback information collecting component:
the information processor acquires an interaction question, asks the user the interaction question through the questioning component, collects feedback information of the user for the interaction question through the touch screen so as to obtain the user's skin condition:
the interaction question is a question about the user's skin condition which is stored locally on the intelligent dresser or is issued by the cloud server;
the questioning component is a speaker or a display component; and
the feedback information collecting component is a sound information collecting component or a touch or push type electronic device.

5. The intelligent dresser according to claim 4, wherein the information processor presents the beauty information suited for the user's skin condition to the user through the touch screen.

6. The intelligent dresser according to claim 3, further comprising a cosmetic mirror facing towards a front side of the user; wherein a portion of the cosmetic mirror is made of a unidirectional perspective glass and the camera component is hidden at a back surface of the unidirectional perspective glass.

7. The intelligent dresser according to claim 1,
wherein the information of the cosmetic product to be accommodated comprises at least one of product attribute information, classification information and validity information and the information of the cosmetic product to be accommodated is obtained on the basis of the scanned barcode or two-dimensional code by the cloud server.

8. The intelligent dresser according to claim 7, wherein the information processor is further configured to present a cosmetic product which approaches or exceeds a validity period to the user based on the validity information of the cosmetic product stored in the cosmetic product database.

9. The intelligent dresser according to claim 1,
wherein the plurality of receptacles are sorted according to the type of the cosmetic products;
the information processing module is further configured to present the receptacles for accommodating the newly added cosmetic product based on sorting information of the newly added cosmetic product;
a pressure sensor is provided at a bottom of each of the receptacles;
the information processor is further provided for sensing the position for accommodating the newly added cosmetic product; and
a transparent cover is provided over the plurality of receptacles, allowing the user to see the cosmetic product accommodated in the receptacle through the transparent cover.

10. An intelligent dressing system, comprising the intelligent dresser of claim 1 and a cloud server, wherein the cloud server is configured for:
in response to receiving a scanned barcode or two-dimensional code of a cosmetic product from the intelligent dresser, acquiring and sending information of the cosmetic product on the basis of the barcode or two-dimensional code to the intelligent dresser; and
in response to receiving a cosmetic product database and information related to user's skin condition from the intelligent dresser,
generating beauty information by selecting one or more selected cosmetic products from the cosmetic products accommodated in the storage box based on the cosmetic product database according to the information related to the user's skin condition, and
issuing the beauty information to the intelligent dresser, wherein the beauty information includes information about skin care products and/or cosmetics.

11. The intelligent dressing system according to claim 10, wherein the cloud server is further configured for:
storing interaction questions; and
issuing the interaction questions; and
wherein the information related to user's skin condition is feedback information of the user for the interaction questions.

12. The intelligent dressing system according to claim 10, wherein the information related to the user's skin condition is a facial image of the user; and
the cloud server is further configured for analyzing the facial image of the user to obtain the user's skin condition.

13. The intelligent dressing system according to claim 10, wherein the cloud server is further configured for obtaining at least one of a weather condition and/or an ultraviolet ray condition for the day and selecting cosmetic products suited for at least one of the user's skin condition, weather conditions and/or ultraviolet ray conditions.

14. The intelligent dressing system according to claim 10, wherein the cloud server is further configured to receive information about at least one of the user's consumption habits and the user's cosmetic style, and select a cosmetic product suited for at least one of the user's skin condition, the user's consumption habits and the user's cosmetic style.

15. The intelligent dressing system according to claim 10, wherein the information of the cosmetic product comprises at least one of a product attribute information, a classification information and/or validity information of cosmetic products.

16. The intelligent dressing system according to claim 10, wherein the cloud server is further configured for providing a short-term skin care recommendation to the user based on the user's skin condition;
and/or tracking change of the user's skin condition over a preset period and provide at least one of long-term skin care recommendations and health tips to the user based on the change of the user's skin condition; and
wherein the cloud server issuing module is also configured to issue at least one of the short-term skin care recommendations, long-term skin care recommendations, and health tips to the intelligent dresser.

17. An intelligent dresser comprising:
a base configured to be a support frame;
a storage box fixed over the base in a horizontal direction, the storage box being a pull-type rectangle box having four corners and comprising a plurality of receptacles configured to accommodate cosmetic products, wherein each of the receptacles accommodates only one of the cosmetic products;
a cosmetic mirror fixed on a back part of the base in a vertical direction, the cosmetic mirror being a rectangle mirror having four corners;
a touch screen disposed on a right side of the cosmetic mirror in a vertical direction, the touch screen being coplanar with the cosmetic mirror and having a height identical to that of the cosmetic mirror such that the touch screen and the cosmetic mirror form a regular rectangle structure;

a scanner disposed at a right side of the storage box and configured to scan a barcode or two-dimensional code on the cosmetic product which comprises at least one of a skin care product or a cosmetic, wherein the storage box has a length greater than that of the cosmetic mirror;

a plurality of status indicators provided for the plurality of the receptacles respectively, wherein the status indicators are connected to an information processor which is configured to receive a cosmetic products recommendation list fed back by the cloud server, provide a signal to the status indicator corresponding to the receptacle in which the corresponding cosmetic product is located to cause lighting or flashing of the status indicator to indicate that the cosmetic product within the receptacle is recommended, and when there is an absence of a desired cosmetic product in a respective receptacle, use the status indicator corresponding to the respective receptacle to indicate the absence of the desired cosmetic product, wherein each of the receptacles is provided with a pressure sensor at a bottom of the receptacle, wherein the pressure sensor is configured to sense whether the cosmetic products are actually accommodated in the receptacle;

wherein the touch screen is divided into:

a general information display region configured to display information related to time, weather conditions of the day, and ultraviolet ray condition, which is obtained by the cloud server, a personalized information display region configured to display skin care advice issued by the cloud server for a user's skin condition, the recommended cosmetic products, currently lacking cosmetic products, and a purchasing channel for the currently lacking cosmetic products;

an information collection region for user interaction, wherein the information collection region is configured to start the user interaction when the user clicks on a start evaluation button displayed in the information collection region, and to display questions to the user and receive feedback from the user, allowing the user to interact with the cloud server in a manner of answering questions, and wherein the information processor is further configured to upload information about the user's skin condition comprising dry skin, oily skin, mixed skin, and/or black head, the 'nsumption habits, and the user's cosmetic style to the cloud server, wherein the scanner is provided at one side of the storage box and is configured to scan the barcode or two-dimensional code on the cosmetic product, the information processor is further configured to receive classification and attribute information of the cosmetic product, which is obtained according to the scanned barcode or two-dimensional code, from the cloud expert device, and storing the classification and attribute information in a beauty database, and the information processor is further configured to search for the receptacle suited for accommodating the cosmetic product according to the classification and attribution information in conjunction with the accommodating sets provided by the user, recommend the receptacle suited for accommodating to the user via the touch screen or the status indicator corresponding to the receptacle, and recode the position of the receptacle in which the cosmetic product is actually put, in the beauty database.

\* \* \* \* \*

UNITED STATES PATENT AND TRADEMARK OFFICE
CERTIFICATE OF CORRECTION

PATENT NO. : 10,592,932 B2
APPLICATION NO. : 15/526332
DATED : March 17, 2020
INVENTOR(S) : Yu Gu et al.

Page 1 of 1

It is certified that error appears in the above-identified patent and that said Letters Patent is hereby corrected as shown below:

In the Claims

Column 14, Line 55 in Claim 2:
Delete "cosmetic the"
Insert -- cosmetic style to the --

Column 18, Line 15 in Claim 17:
Delete "'nsumption"
Insert -- consumption --

Signed and Sealed this
Sixteenth Day of June, 2020

Andrei Iancu
*Director of the United States Patent and Trademark Office*